US010920059B2

(12) United States Patent
Yamamoto et al.

(10) Patent No.: US 10,920,059 B2
(45) Date of Patent: Feb. 16, 2021

(54) COMPOSITE RESIN MATERIAL AND MOLDED ARTICLE

(71) Applicants: TOHO KASEI CO., LTD., Yamatokoriyama (JP); TAIYO NIPPON SANSO CORPORATION, Tokyo (JP)

(72) Inventors: Hirokazu Yamamoto, Yamatokoriyama (JP); Takafumi Nakagawa, Yamatokoriyama (JP); Hirotaka Itami, Yamatokoriyama (JP); Isamu Noguchi, Yamatokoriyama (JP); Katsunori Takada, Tokyo (JP); Yasuhito Koda, Tokyo (JP); Toru Sakai, Tokyo (JP)

(73) Assignees: TOHO KASEI CO., LTD., Yamatokoriyama (JP); TAIYO NIPPON SANSO CORPORATION, Tokyo (JP)

( * ) Notice: Subject to any disclaimer, the term of this patent is extended or adjusted under 35 U.S.C. 154(b) by 0 days.

(21) Appl. No.: 16/631,959

(22) PCT Filed: Jul. 20, 2018

(86) PCT No.: PCT/JP2018/027356
§ 371 (c)(1),
(2) Date: Jan. 17, 2020

(87) PCT Pub. No.: WO2019/017487
PCT Pub. Date: Jan. 24, 2019

(65) Prior Publication Data
US 2020/0165435 A1    May 28, 2020

(30) Foreign Application Priority Data
Jul. 21, 2017   (JP) .............................. JP2017-142262

(51) Int. Cl.
| C08L 27/18 | (2006.01) |
| C08L 27/22 | (2006.01) |
| C08K 3/04 | (2006.01) |
| B29C 43/00 | (2006.01) |

(52) U.S. Cl.
CPC ............ *C08L 27/18* (2013.01); *B29C 43/003* (2013.01); *C08K 3/041* (2017.05); *C08L 27/22* (2013.01); *C08L 2203/16* (2013.01); *C08L 2203/18* (2013.01); *C08L 2205/02* (2013.01)

(58) Field of Classification Search
CPC ............ C08L 27/18; C08K 3/04; B29C 43/00
USPC ........................................................ 524/544
See application file for complete search history.

(56) References Cited

U.S. PATENT DOCUMENTS

| 5,760,151 A * | 6/1998 | Aten ................... C08F 214/262 |
| | | 526/247 |
| 6,281,281 B1 | 8/2001 | Asano et al. |
| 2002/0061956 A1 | 5/2002 | Kobayashi et al. |
| 2006/0122333 A1 * | 6/2006 | Nishio ..................... C08J 3/005 |
| | | 525/199 |
| 2013/0267621 A1 * | 10/2013 | Sawada ................... B01D 71/36 |
| | | 521/134 |
| 2013/0310522 A1 * | 11/2013 | Yajima ..................... C08K 7/24 |
| | | 525/326.2 |

FOREIGN PATENT DOCUMENTS

| EP | 3524642 | 4/2019 | |
| JP | 2001-354778 | 12/2001 | |
| JP | 2002-97330 | 4/2002 | |
| JP | 2002-128981 | 5/2002 | |
| JP | 2014-034591 | 2/2014 | |
| JP | 2015-030821 | 2/2015 | |
| WO | WO-2005052015 A1 * | 6/2005 | ............. C08F 14/18 |
| WO | 2012/107991 | 8/2012 | |
| WO | 2018/066706 | 4/2018 | |

OTHER PUBLICATIONS

International Search Report (English) and Written Opinion dated Sep. 25, 2018, from International Application No. PCT/JP2018/027356, 9 pages.
Reasons for Refusal dated Sep. 26, 2019 in JP Application No. 2019-530623 (4 pages).
English translation of amended claims filed in JP Application No. 2019-530623 dated Oct. 10, 2019 (2 pages).
Decision to Grant a Patent dated Dec. 24, 2019 in JP Application No. 2019-530623 (2 pages).

* cited by examiner

*Primary Examiner* — Deve V Hall
(74) *Attorney, Agent, or Firm* — Meunier Carlin & Curfman LLC

(57) ABSTRACT

An object of the present invention is to provide a resin material that yields a resin molded article which has not only a low volume resistivity but also excellent weldability and cleanliness and whose volume resistivity is unlikely to be increased even when subjected to an SPM cleaning treatment and the like. The present invention provides a composite resin material that contains a modified polytetrafluoroethylene and carbon nanotubes and has an average particle diameter of 500 μm or smaller.

7 Claims, 2 Drawing Sheets

COMPOSITE RESIN MATERIAL AND MOLDED ARTICLE

TECHNICAL FIELD

This patent application claims priority under the Paris Convention based on Japanese Patent Application No. 2017-142262 (filed on Jul. 21, 2017), which is incorporated herein by reference in its entirety.

The present invention relates to: a composite resin material comprising a modified polytetrafluoroethylene and carbon nanotubes; and a molded article produced using the composite resin material.

BACKGROUND ART

In the fields of semiconductor components, automobile parts and the like, development and practical application of a novel electroconductive material obtained by forming a composite between a resin material and a carbon nanomaterial such as a carbon nanotube are expected. In the utilization of a carbon nanomaterial in an electroconductive material, the dispersibility of the carbon nanomaterial in a resin material presents a problem in some cases, and various attempts have been made to improve the dispersibility of a carbon nanomaterial.

For example, Patent Document 1 discloses a method for producing composite resin material particles using carbon dioxide in a subcritical or supercritical state, whose particles contain particles of a fluorine resin, such as a polytetrafluoroethylene, and a carbon nanomaterial. Patent Document 2 discloses a method for producing composite resin particles in which particles of a fluorine resin, such as a polytetrafluoroethylene, and a carbon nanomaterial are allowed to form a composite using a ketone-based solvent.

PRIOR ART DOCUMENTS

Patent Documents

[Patent Document 1] JP 2014-34591 A
[Patent Document 2] JP 2015-30821 A

SUMMARY OF THE INVENTION

Problems to be Solved by the Invention

When a semiconductor component contains a contaminant such as a metal impurity or a surface-adsorbing chemical substance, the contaminant potentially adversely affects the reliability of a semiconductor product obtained from the semiconductor component. Accordingly, in the semiconductor production, the washing step for removal of contaminants such as metal impurities and surface-adsorbing chemical substances from a wafer and the like is viewed as an important step, and various washing methods have been examined. For example, SPM cleaning with the use of sulfuric acid, hydrogen peroxide and the like is performed as a typical washing method. The present inventors discovered that SPM cleaning treatment of a molded article produced using a carbon nanomaterial-containing electroconductive material sometimes results in an increase in volume resistivity and thus a reduction in electroconductivity. Therefore, the present inventors investigated materials whose volume resistivity is unlikely to be increased even when subjected to, for example, SPM cleaning treatment.

Further, in the semiconductor production, from the standpoint of avoiding incorporation of contaminants such as metal impurities and surface-adsorbing chemical substances, it is conceivable to reduce the amount of contaminants that can be incorporated from raw materials and production equipment used for the semiconductor production. As a method for this, for example, it may be possible to inhibit incorporation of contaminants originating from the inner wall of a semiconductor production equipment by laminating a resin thereto. However, there is a problem that adequate adhesion between the inner wall of a production equipment and a resin cannot be attained due to insufficient flexibility and weldability of the resin with the inner wall of the production equipment. In addition, for example, in cases where an organic solvent used for the semiconductor production is stored in a production equipment in which a resin is pasted to the inner wall, there may be a problem of ignition caused by electrification of the stored organic solvent. Moreover, contaminants originating from the resin itself used as the inner wall may be incorporated into the organic solvent.

In the production of an antistatic material or an electroconductive material, it has been tested to add, for example, an electroconductive material such as carbon fibers or carbon black to a resin for the purpose of reducing the volume resistivity. However, in the use of such an electroconductive material, since a large amount of the electroconductive material is required for achieving the desired antistatic properties or electroconductivity, there may be a problem of omission or the like of the electroconductive material, and the cleanliness is not necessarily sufficient. In addition, when a resin containing a large amount of such an electroconductive material is used for welding, the electroconductive material in the resin can be a factor that hinders the adherence of the welding surface.

Moreover, in the production of an antistatic material or an electroconductive material, an addition of an electroconductive material such as carbon fibers or carbon black to a resin, which is done for the purpose of reducing the volume resistivity, may modify the intrinsic mechanical strength of the resin. For example, when carbon fibers are added, incorporation of fibrous material into the resin tends to improve the compressive strength and the compressive elastic modulus; however, since the tensile strength and the tensile elongation tend to be reduced, such modification of the mechanical strength is not desirable particularly in those applications where flexibility is required.

In view of the above, an object of the present invention is to provide a resin material that yields a resin molded article which has not only a low volume resistivity but also excellent weldability and cleanliness and whose volume resistivity is unlikely to be increased even when subjected to an SPM cleaning treatment or the like.

Means for Solving the Problems

The present inventors discovered that the above-described object can be achieved by the below-described composite resin material of the present invention.

That is, the present invention encompasses the following preferred modes.

[1] A composite resin material, comprising a modified polytetrafluoroethylene and carbon nanotubes and having an average particle diameter of 500 μm or smaller.

[2] The composite resin material according to [1], comprising the carbon nanotubes in an amount of 0.01 to 2.0% by mass based on a total amount of the composite resin material.

[3] The composite resin material according to [1] or [2], wherein the modified polytetrafluoroethylene is a compound comprising:

a tetrafluoroethylene unit represented by the following Formula (I):

a perfluorovinyl ether unit represented by the following Formula (II):

[wherein, X represents a perfluoroalkyl group having 1 to 6 carbon atoms, or a perfluoroalkoxyalkyl group having 4 to 9 carbon atoms].

[4] The composite resin material according to any one of [1] to [3], wherein the perfluorovinyl ether unit represented by Formula (II) is contained in the modified PTFE in an amount of preferably 0.01 to 1% by mass based on a total mass of the modified polytetrafluoroethylene.

[5] The composite resin material according to any one of [1] to [4], having a specific surface area of 0.5 to 9.0 m²/g as measured by a BET method.

[6] The composite resin material according to any one of [1] to [5], having a volume resistivity of $10^{11}$ Ω·cm or lower as measured in accordance with JIS K6911.

[7] The composite resin material according to any one of [1] to [6], wherein the modified polytetrafluoroethylene has a crystallization heat of 16 J/g or higher.

[8] A molded article produced using the composite resin material according to any one of [1] to [7].

[9] The molded article according to [8], having a shape selected from the group consisting of a plate shape, a rod shape, a film shape, a sheet shape, an aggregate shape, and a tubular shape.

[10] The composite resin material according to [1], being produced by forming a composite between particles of the modified polytetrafluoroethylene and the carbon nanotubes using carbon dioxide in a subcritical or supercritical state, or a ketone-based solvent.

Effects of the Invention

A molded article produced using the composite resin material of the present invention has not only a low volume resistivity but also excellent weldability and cleanliness, and its volume resistivity is unlikely to be increased even when the molded article is subjected to an SPM cleaning treatment or the like.

MODES FOR CARRYING OUT THE INVENTION

Figure 1:
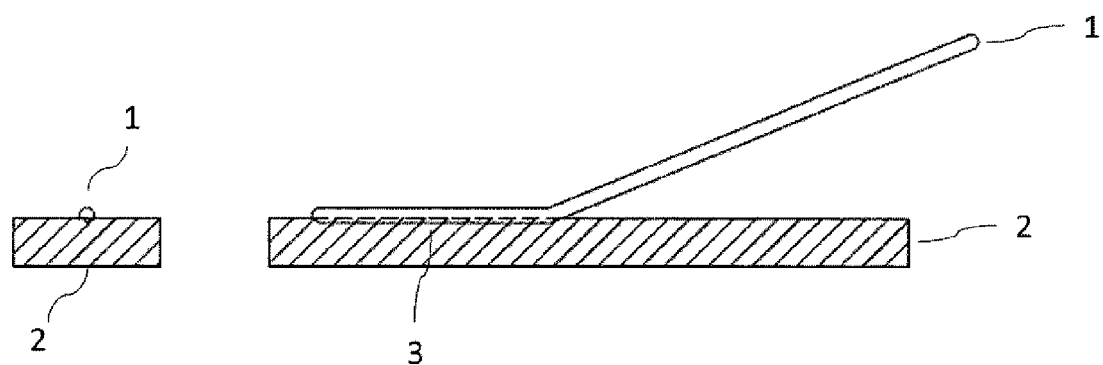
FIG. 1 is a drawing that illustrates a measurement sample used for measuring the weld strength of the composite resin material of the present invention.

Embodiments of the present invention will now be described in detail. It is noted here, however, that the scope of the present invention is not restricted to the below-described embodiments, and various modifications, additions and deletions can be made within a range that does not depart from the gist of the present invention.

The composite resin material of the present invention comprises a modified polytetrafluoroethylene and carbon nanotubes. The composite resin material of the present invention is a material obtained by forming a composite of a modified polytetrafluoroethylene and carbon nanotubes, and the carbon nanotubes exist at least on the surfaces and/or in the surface layers of modified polytetrafluoroethylene particles. For example, the carbon nanotubes are at least partially supported on or embedded in the surfaces of the modified polytetrafluoroethylene particles. The carbon nanotubes may be supported in the state of being adhered to or partially embedded in the surfaces of the modified polytetrafluoroethylene particles, or the carbon nanotubes may be completely embedded in the surface layers of the modified polytetrafluoroethylene particles.

The composite resin material of the present invention has an average particle diameter of 500 μm or smaller. When the average particle diameter is larger than 500 μm, a molded article in which the carbon nanotubes are uniformly dispersed cannot be obtained and, particularly in a thin molded article, its volume resistivity cannot be reduced sufficiently. The composite resin material of the present invention has an average particle diameter of preferably 300 μm or smaller, more preferably 200 μm or smaller, still more preferably 100 μm or smaller, particularly preferably 50 μm or smaller, extremely preferably 30 μm or smaller. When the average particle diameter is not larger than the above-described upper limit, the volume resistivity of an eventually obtained molded article is likely to be efficiently reduced, which is preferred. The expression "the volume resistivity . . . is likely to be efficiently reduced" used herein means that, for example, a high effect of reducing the volume resistivity can be attained with a small amount of the carbon nanotubes and, in other words, the incorporated carbon nanotubes exhibit a high effect of reducing the volume resistivity with respect to its added amount. The lower limit value of the average particle diameter of the composite resin material of the present invention is not particularly restricted; however, it is usually 5 μm or larger. The average particle diameter of the composite resin material is a median diameter ($D_{50}$), which means a particle diameter at an integrated value of 50% in a particle size distribution determined by a laser diffraction-scattering method, and is measured using a laser diffraction-scattering particle size distribution analyzer. As apparent from the feature of having the above-described average particle diameter, the composite resin material of the present invention is a particulate composite resin material.

In the composite resin material of the present invention, the modified polytetrafluoroethylene and the carbon nanotubes form a composite and the average particle diameter is controlled in the above-described range, whereby the volume resistivity of a molded article produced using the composite resin material of the present invention can be effectively reduced, and the molded article can be imparted with antistatic properties and/or electroconductivity. In addition, an increase in the volume resistivity caused by an SPM cleaning treatment or the like is made unlikely to occur.

Further, by allowing the composite to be formed with a small amount of the carbon nanotubes, the volume resistivity can be effectively reduced, so that excellent cleanliness is attained. Still further, for example, by using the composite resin material of the present invention, which has the above-described constitution, as a welding material, a resin molded article having excellent weldability with a high weld strength can be obtained. Moreover, since the composite resin material of the present invention hardly shows an increase in its volume resistivity due to an SPM cleaning treatment or the like, it is believed that the composite resin material is unlikely to be degenerated by an SPM cleaning treatment or the like. Accordingly, the composite resin material of the present invention is believed to also have a characteristic feature that its mechanical strength is unlikely to be reduced even when subjected to an SPM cleaning treatment (a sulfuric acid-hydrogen peroxide washing treatment: a washing treatment using a mixture of sulfuric acid and hydrogen peroxide) or the like. Furthermore, the composite resin material of the present invention, which has the above-described constitution, is believed to have a high flexibility as well.

As described above, a molded article obtained using the composite resin material of the present invention is resistant to an SPM cleaning treatment and the like, and has excellent weldability and cleanliness in addition to a low volume resistivity. Therefore, this molded article is suitable as a molded article to be used in a washing process in the semiconductor production, a molded article to be pasted to the inner wall of a semiconductor production equipment, and a molded article to be pasted to a production equipment in which a chemical liquid used in the semiconductor production, such as an organic solvent, is stored. Accordingly, by using such a molded article, not only an antistatic effect and/or electroconductivity can be obtained, but also incorporation of contaminants originating from a semiconductor washing equipment or a semiconductor production equipment can be inhibited. A chemical liquid that may come into contact with the molded article is not particularly restricted, and examples thereof include various chemical liquids that are used in semiconductor washing process and semiconductor production process, such as SPM cleaning liquids (e.g., sulfuric acid and hydrogen peroxide) and organic solvents. Specifically, the chemical liquid may contain at least one selected from the group consisting of, for example, an organic solvent, a flammable liquid, an acidic liquid, a basic liquid, a neutral liquid, an aqueous solution, and an electroconductive liquid.

Examples of the organic solvent include isopropyl alcohol (IPA), ethanol, acetone, tetrahydrofuran (THF), and methyl ethyl ketone (MEK). Examples of the flammable liquid include isopropyl alcohol (IPA), ethanol, acetone, tetrahydrofuran (THF), and methyl ethyl ketone (MEK). Examples of the acidic liquid include hydrochloric acid, nitric acid, hydrofluoric acid, sulfuric acid, and hydrogen peroxide. Examples of the basic liquid include aqueous ammonia. Examples of the neutral liquid include ozone water, so-called water, ultrapure water, pure water, deionized water, ion exchanged water, and distilled water. Examples of the aqueous solution include hydrochloric acid, nitric acid, hydrofluoric acid, sulfuric acid, aqueous ammonia, hydrogen peroxide, and ozone water. Examples of the electroconductive liquid include hydrochloric acid, nitric acid, hydrofluoric acid, sulfuric acid, aqueous ammonia, so-called water, ion exchanged water, deionized water, and pure water.

The chemical liquid that may come into contact with the molded article is preferably an organic solvent. An organic solvent is a chemical liquid used in the semiconductor production and the like and, in the semiconductor production, even a static electricity of a chemical liquid or contamination with a trace amount of a contaminant causes a problem; therefore, the advantages of the molded article of the present invention are more likely to be displayed. The chemical liquid that may come into contact with the molded article can be an electroconductive liquid as well.

Examples of the modified polytetrafluoroethylene (hereinafter, also referred to as "modified PTFE") contained in the composite resin material of the present invention include modified polytetrafluoroethylenes containing, in addition to a tetrafluoroethylene unit that is derived from tetrafluoroethylene and represented by the following Formula (I):

$$—CF_2—CF_2— \quad\quad\quad (I),$$

for example, a perfluorovinyl ether unit represented by the following Formula (II):

[wherein, X represents a perfluoroalkyl group having 1 to 6 carbon atoms, or a perfluoroalkoxyalkyl group having 4 to 9 carbon atoms].

In Formula (II), X is, for example, a perfluoroalkyl group having 1 to 6 carbon atoms, or a perfluoroalkoxyalkyl group having 4 to 9 carbon atoms. Examples of the perfluoroalkyl group having 1 to 6 carbon atoms include a perfluoromethyl group, a perfluoroethyl group, a perfluoropropyl group, and a perfluorobutyl group. Examples of the perfluoroalkoxyalkyl group having 4 to 9 carbon atoms include a perfluoro-2-methoxypropyl group and a perfluoro-2-propoxypropyl group. From the standpoint of improving the thermal stability of the modified PTFE, X is preferably a perfluoropropyl group, a perfluoroethyl group or a perfluoromethyl group, more preferably a perfluoropropyl group. The modified PTFE may have a single perfluorovinyl ether unit represented by Formula (II), or two or more perfluorovinyl ether units represented by Formula (II).

The amount of the perfluorovinyl ether unit represented by Formula (II) that is contained in the modified PTFE is preferably 0.01 to 1% by mass, more preferably 0.03 to 0.7% by mass, still more preferably 0.03 to 0.2% by mass, based on a total mass of the modified polytetrafluoroethylene. When the amount of the perfluorovinyl ether unit represented by Formula (II) is in the above-described range, the flexibility and the weldability of a molded article obtained from the composite resin material are likely to be improved, which is preferred. The amount of the perfluorovinyl ether unit is determined by, for example, infrared spectrophotometry performed in a characteristic absorption range of 1,040 to 890 cm$^{-1}$.

In the composite resin material of the present invention, the modified PTFE has a melting point of preferably 300 to 380° C., more preferably 320 to 380° C., still more preferably 320 to 350° C. The moldability is likely to be improved when the melting point is not lower than the above-described lower limit, and the resin is likely to attain optimum mechanical properties when the melting point is not higher than the above-described upper limit, which are both preferred. The melting point of the modified PTFE is a value determined as a peak temperature of heat of fusion, which can be measured in accordance with ASTM-D4591 using a differential scanning calorimeter (DSC).

In the composite resin material of the present invention, the modified PTFE has a crystallization heat of preferably 16 J/g or higher, more preferably 16 to 25 J/g, still more preferably 18 to 23.5 J/g. The crystallization heat is measured using a differential scanning calorimeter (e.g., "DSC-50" manufactured by Shimadzu Corporation). Specifically, about 3 mg of a sample is heated to 250° C. at a rate of 50° C./min, maintained at this temperature once, and further heated to 380° C. at a rate of 10° C./min so as to melt crystals, after which the sample is cooled at a rate of 10° C./min, and a peak crystallization temperature measured in this process is converted into the amount of heat, whereby the crystallization heat is determined.

The amount of the modified PTFE contained in the composite resin material of the present invention is preferably not less than 98.0% by mass, more preferably not less than 99.0% by mass, still more preferably not less than 99.5% by mass, particularly preferably not less than 99.8% by mass, based on a total amount of the composite resin material. When the amount of the modified PTFE is not less than the above-described lower limit, the mechanical properties and the moldability of the composite resin material are likely to be improved, which is preferred. The upper limit of the amount of the modified PTFE is not particularly restricted; however, it is about 99.99% by mass or less. The amount of the modified PTFE contained in the composite resin material is determined by a carbon component analysis method.

The carbon nanotubes (hereinafter, also referred to as "CNTs") contained in the composite resin material of the present invention have a structure in which one or more graphene sheets constituted by six-membered rings of carbon atoms are wound in a cylindrical form. The CNTs are single-wall CNTs (single-wall carbon nanotubes) in which a single graphene sheet is concentrically wound, or multi-wall CNTs (multi-wall carbon nanotubes) in which two or more graphene sheets are concentrically wound. These carbon nanomaterials may be used individually, or in any combination thereof. From the standpoints of the ease of forming a composite of the carbon nanotubes with particles of the modified PTFE and the ease of reducing the volume resistivity, the carbon nanotubes are more preferably multi-wall carbon nanotubes.

The amount of the carbon nanotubes contained in the composite resin material of the present invention is preferably not less than 0.01% by mass, more preferably not less than 0.015% by mass, still more preferably not less than 0.02% by mass, particularly preferably not less than 0.025% by mass, based on a total amount of the composite resin material. When the amount of the carbon nanotubes is not less than the above-described lower limit, the antistatic properties or the electroconductivity is likely to be improved and the volume resistivity is thus likely to be reduced, which is preferred. Meanwhile, the amount of the carbon nanotubes is preferably 2% by mass or less, more preferably 1% by mass or less, still more preferably 0.5% by mass or less, particularly preferably 0.2% by mass or less, based on a total amount of the composite resin material. When the amount of the carbon nanotubes is not greater than the above-described upper limit, the volume resistivity is likely to be reduced efficiently, which is preferred. The amount of the carbon nanotubes contained in the composite resin material is determined by a carbon component analysis method.

The composite resin material of the present invention has a specific surface area of preferably 0.5 to 9.0 m$^2$/g, more preferably 0.8 to 4.0 m$^2$/g, still more preferably 1.0 to 3.0 m$^2$/g, particularly preferably 1.0 to 2.0 m$^2$/g, as measured in accordance with JIS Z8830. The specific surface area is preferably not smaller than the above-described lower limit from the standpoint of the ease of improving the adhesion between the modified PTFE particles and the carbon nanotubes, and the specific surface area is also preferably not larger than the above-described upper limit from the standpoints of the ease of producing the composite resin material and the ease of efficiently reducing the volume resistivity. Specifically, the specific surface area of the composite resin material is measured by a BET method, which is a commonly-used specific surface area measurement method, using a specific surface area/pore distribution analyzer based on a constant-volume gas adsorption method (e.g., BEL-SORP-mini II manufactured by Bel Japan Corp.).

In a mode where the composite resin material of the present invention is used in an application that requires antistatic properties, the volume resistivity of the composite resin material is preferably $1.0 \times 10^{11}$ Ω·cm or lower, more preferably $1.0 \times 10^8$ Ω·cm or lower, still more preferably $1.0 \times 10^7$ Ω·cm or lower, particularly preferably $1.0 \times 10^6$ Ω·cm or lower, as measured in accordance with JIS K6911. When the volume resistivity is not higher than the above-described upper limit, good antistatic properties are attained. Further, in a mode where the composite resin material of the present invention is used in an application that requires electroconductivity, the volume resistivity of the composite resin material is preferably $1.0 \times 10^6$ Ω·cm or lower, more preferably $1.0 \times 10^5$ Ω·cm or lower, still more preferably $1.0 \times 10^4$ Ω·cm or lower, as measured in accordance with JIS K6911. When the volume resistivity is not higher than the above-described upper limit, good electroconductivity is attained. The lower limit value of the volume resistivity of the composite resin material is not particularly restricted and may be 0 or higher; however, it is usually 10 Ω·cm or higher. The volume resistivity of the composite resin material is measured using a resistivity meter (e.g., "LORESTA" or "HIRESTA" manufactured by Mitsubishi Chemical Analytech Co., Ltd.) in accordance with JIS K6911 for a molding material or a test piece prepared by cutting. For example, when the measurement is performed using a test piece of φ110×10 mm prepared by compression molding, the composite resin material preferably shows the above-described volume resistivity.

According to the composite resin material of the present invention, the desired antistatic properties or electroconductivity can be achieved with an addition of a small amount of carbon nanotubes, although the reason for this is not clear. Therefore, the composite resin material of the present invention has excellent cleanliness. Further, even when a molded article produced from the composite resin material of the present invention is used for welding, since the amount of an electroconductive material existing on the welding surface is small, a reduction in adherence can be avoided. Moreover, according to the composite resin material of the present invention, even when its volume resistivity is in the above-described range, the mechanical strength intrinsic to a resin is likely to be maintained. Specifically, the composite resin material of the present invention preferably has the below-described mechanical strength.

The composite resin material of the present invention has a tensile elastic modulus of preferably 200 to 800 MPa, more preferably 300 to 600 MPa, still more preferably 400 to 500 MPa. The tensile elastic modulus of the composite resin material is measured in accordance with JIS K7137-2-A for a dumbbell test piece at a load of 5 kN and a rate of 1 mm/min using a tensile tester (e.g., "TENSILON Universal Material Testing Instrument" manufactured by A&D Co., Ltd.).

The composite resin material of the present invention has a tensile strength of preferably 10 to 50 MPa, more preferably 20 to 40 MPa, still more preferably 25 to 35 MPa. The tensile strength of the composite resin material is measured using the same test piece and tester as in the measurement of the tensile elastic modulus.

The composite resin material of the present invention has a tensile elongation (breaking point) of preferably 100 to 500%, more preferably 150 to 450%, still more preferably 150 to 400%, particularly preferably 200 to 400%. The tensile elongation of the composite resin material is measured using the same test piece and tester as in the measurement of the tensile elastic modulus.

The composite resin material of the present invention has a compressive elastic modulus of preferably 200 to 1,000 MPa, more preferably 300 to 800 MPa, still more preferably 400 to 600 MPa. The compressive elastic modulus of the composite resin material is measured for a test piece of (8×20 mm at a load of 5 kN and a rate of 1 mm/min using a compression tester (e.g., "TENSILON Universal Material Testing Instrument" manufactured by A&D Co., Ltd.).

The composite resin material of the present invention has a compressive strength (1% deformation) of preferably 3 to 10 MPa, more preferably 4 to 8 MPa, still more preferably 5 to 6 MPa. The compressive strength of the composite resin material is measured using the same test piece and tester as in the measurement of the compressive elastic modulus.

The composite resin material of the present invention has a compressive strength (25% deformation) of preferably 10 to 40 MPa, more preferably 20 to 40 MPa, still more preferably 25 to 35 MPa. The compressive strength of the composite resin material is measured using the same test piece and tester as in the measurement of the compressive elastic modulus.

The composite resin material of the present invention has a bending elastic modulus of preferably 200 to 1,000 MPa, more preferably 400 to 800 MPa, still more preferably 500 to 600 MPa. The bending elastic modulus of the composite resin material is measured for a test piece of 4 mm in thickness, 10 mm in width and 80 mm in length at a load of 5 kN and a rate of 10 mm/min using a bending tester (e.g., "TENSILON Universal Material Testing Instrument" manufactured by A&D Co., Ltd.).

The composite resin material of the present invention has a bending strength of preferably 50 to 90 MPa, more preferably 65 to 80 MPa, still more preferably 65 to 75 MPa. The bending strength of the composite resin material is measured using the same test piece and tester as in the measurement of the bending elastic modulus. In another mode, the composite resin material of the present invention has a bending strength of preferably 10 to 40 MPa, more preferably 10 to 30 MPa, still more preferably 15 to 25 MPa. The bending strength of the composite resin material is measured using the same test piece and tester as in the measurement of the bending elastic modulus.

The composite resin material of the present invention has a weld strength of preferably 5 to 20 MPa, more preferably 8 to 20 MPa, still more preferably 10 to 15 MPa. The method of measuring the weld strength of the composite resin material is as described below in the section of Examples, and the weld strength is measured as the weld strength with a PFA welding rod using a tensile tester (e.g., "TENSILON Universal Material Testing Instrument" manufactured by A&D Co., Ltd.).

A method of producing each test piece for the above-described measurements of mechanical strength will now be described. A molded article obtained using the composite resin material of the present invention is made into a test piece. The test piece is produced by a method of performing a firing treatment on an unfired compression-molded article.

The "unfired compression-molded article" is produced by performing an appropriate pretreatment(s) (e.g., pre-drying and granulation) on the composite resin material of the present invention as required, and subsequently placing and compressing the composite resin material in a mold. The pressure applied in this compressing process for the production of the unfired compression-molded article is preferably 0.1 to 100 MPa, more preferably 1 to 80 MPa, still more preferably 5 to 50 MPa.

The thus obtained "unfired compression-molded article" is fired at a temperature of not lower than the melting point of the composite resin material, whereby a test piece is produced. The firing temperature varies depending on the dimensions of the unfired compression-molded article, the firing time and the like; however, it is preferably 345 to 400° C., more preferably 360 to 390° C. The unfired compression-molded article is placed in a firing furnace and then fired preferably at the above-described firing temperature to produce a fired compression-molded article. The thus obtained molded article may be directly used as a test piece, or a test piece may be prepared by cutting the molded article.

The composite resin material of the present invention is a material obtained by forming a composite of a modified polytetrafluoroethylene and carbon nanotubes. A method of producing the composite resin material of the present invention is not particularly restricted as long as the method can yield a composite resin material which preferably has the above-described physical properties and in which the carbon nanotubes exist at least on the surface and/or in the surface layer of the modified polytetrafluoroethylene. The composite resin material of the present invention can be produced by forming a composite between particles of the modified polytetrafluoroethylene and the carbon nanotubes using, for example, carbon dioxide in a subcritical or supercritical state in accordance with the method described in JP 2014-34591 A or a ketone-based solvent in accordance with the method described in JP 2015-30821 A.

The composite resin material of the present invention is preferably a composite resin material having an average particle diameter of 500 µm or smaller, which is produced by forming a composite between particles of the modified polytetrafluoroethylene and the carbon nanotubes using carbon dioxide in a subcritical or supercritical state, or a ketone-based solvent. By employing the above-described production method, it is believed that a composite resin material in which the carbon nanotubes exist at least on the surface and/or in the surface layer of the modified polytetrafluoroethylene can be obtained. Consequently, in a molded article obtained using such a composite resin material, it is likely that the volume resistivity is reduced while the weldability and the cleanliness are improved, and the volume resistivity is made less likely to be increased even when the molded article is subjected to an SPM cleaning treatment or the like.

A production method in which a composite is formed between particles of a modified polytetrafluoroethylene and carbon nanotubes using carbon dioxide in a subcritical or supercritical state will now be described concretely. In a first step, carbon nanotubes are dispersed in a solvent to prepare a carbon nanotube dispersion. Examples of the solvent include water, alcohol-based solvents (e.g., ethanol, n-butyl alcohol, isopropyl alcohol, and ethylene glycol), ester-based solvents (e.g., ethyl acetate), ether-based solvents (e.g., diethyl ether and dimethyl ether), ketone-based solvents (e.g., methyl ethyl ketone, acetone, diethyl ketone, methyl propyl ketone, and cyclohexanone), aliphatic hydrocarbon-based solvents (e.g., hexane and heptane), aromatic hydrocarbon-based solvents (e.g., toluene and benzene), and chlorinated hydrocarbon-based solvents (e.g., dichloromethane, chloroform, and chlorobenzene). These solvents may be used individually, or two or more thereof may be used in combination. From the standpoint of the ease of allowing the modified polytetrafluoroethylene and the carbon nanotubes to form a composite, it is preferred to use a solvent with which the surfaces of the particles of the modified polytetrafluoroethylene are readily swollen and, specifically, it is preferred to use a ketone-based solvent.

From the standpoint of the ease of monodispersing the carbon nanotubes in the solvent, the amount of the solvent to be contained in the carbon nanotube dispersion is preferably 20,000 to 1,000,000 parts by mass, more preferably 30,000 to 300,000 parts by mass, still more preferably 50,000 to 200,000 parts by mass, with respect to 100 parts by mass of the carbon nanotubes contained in the carbon nanotube dispersion.

The carbon nanotubes used in the production of the composite resin material of the present invention have an average length of preferably 50 to 600 µm, more preferably 50 to 300 µm, still more preferably 100 to 200 µm. The average length of the carbon nanotubes is measured using a scanning electron microscope (SEM or FE-SEM) or a transmission electron microscope (TEM).

The carbon nanotubes can be produced by any conventional production method. Specific examples thereof include catalytic hydrogen reduction of carbon dioxide, an arc discharge method, a laser vaporization method, a vapor-phase growth method such as a CVD method, a vapor-phase flow method, a HiPco method in which carbon monoxide is allowed to react along with an iron catalyst under high temperature and high pressure and to grow in a gas phase, and an oil furnace method. Commercially available carbon nanotubes, such as "NC7000" manufactured by Nanocyl Corp., may be used as well.

When dispersing the carbon nanotubes in the solvent, a dispersant may be used for the purpose of improving the dispersibility of the carbon nanotubes. Examples of the dispersant include acrylic dispersants; synthetic polymers, such as polyvinylpyrrolidone and polyaniline sulfonate; DNAs; peptides; and organic amine compounds. These dispersants may be used individually, or two or more thereof may be used in combination. From the standpoint of the ease of reducing the amount of the dispersant remaining in a molded article to be eventually obtained, the dispersant preferably has a boiling point that is lower than the temperature at which the composite resin material of the present invention is molded. In cases where a dispersant is used, the amount of the dispersant to be contained in the carbon nanotube dispersion may be selected as appropriate in accordance with the types and the amounts of the carbon nanotubes, the solvent and the dispersant. For example, the amount of the dispersant to be used is preferably 100 to 6,000 parts by mass, more preferably 200 to 3,000 parts by mass, still more preferably 300 to 1,000 parts by mass, with respect to 100 parts by mass of the carbon nanotubes.

When water is used as the solvent in the above-described first step, the carbon nanotube dispersion is mixed with an alcoholic solvent or the like prior to the below-described second step. The reason for this is because the affinity between the modified PTFE particles added in the subsequent second step and water is low and it is thus difficult to disperse the modified PTFE particles in the carbon nanotube dispersion in which water is used as the solvent. Accordingly, by mixing the carbon nanotube dispersion with an alcohol-based solvent, the affinity between the modified PTFE particles and the carbon nanotube dispersion can be improved.

Next, in the second step, the modified PTFE particles are added to the carbon nanotube dispersion, and the resultant is stirred to prepare a mixed slurry in which the carbon nanotubes and the modified PTFE particles are dispersed.

When the modified PTFE particles are added to the carbon nanotube dispersion, the carbon nanotubes in the dispersion gradually adsorb to the modified PTFE surface. In this process, by adjusting the temperature of the solvent, the dispersion concentration of the carbon nanotubes and that of the modified PTFE particles as well as the addition rate of the modified PTFE particles and the like as appropriate, the carbon nanotubes can be adsorbed to the modified PTFE surface while maintaining a highly dispersed state of the carbon nanotubes and the modified PTFE particles. This method enables to uniformly disperse the carbon nanotubes on the surfaces of the modified PTFE particles even at a low addition concentration. Further, even when long carbon nanotubes are used, the carbon nanotubes can be uniformly dispersed on the surfaces of the modified PTFE particles without deterioration of their properties. As for the addition of the modified PTFE particles, the modified PTFE particles may be added as is or in the form of a dispersion in which the modified PTFE particles are dispersed in a solvent in advance.

The modified PTFE particles used in the production of the composite resin material of the present invention have an average particle diameter of preferably 5 to 500 µm, more preferably 10 to 250 µm, still more preferably 10 to 100 µm, particularly preferably 10 to 50 µm, extremely preferably 15 to 30 µm. The average particle diameter of the modified PTFE particles is preferably not larger than the above-described upper limit from the standpoints of the ease of improving the dispersibility of the carbon nanotubes in a molded article produced from the composite resin material and the ease of uniformly improving the antistatic properties and/or the electroconductivity. The average particle diameter of the modified PTFE particles is preferably not smaller than the above-described lower limit from the standpoint of the ease of producing the composite resin material. The average particle diameter of the modified PTFE particles is a median diameter ($D_{50}$), which means a particle diameter at an integrated value of 50% in a particle size distribution determined by a laser diffraction-scattering method, and is measured using a laser diffraction-scattering particle size distribution analyzer.

The modified PTFE particles used in the production of the composite resin material of the present invention have a specific surface area of preferably 0.5 to 9.0 $m^2$/g, more preferably 0.8 to 4.0 $m^2$/g, still more preferably 1.0 to 3.0 $m^2$/g, as measured in accordance with JIS Z8830. The specific surface area of the modified PTFE particles is preferably not larger than the above-described upper limit from the standpoint of the ease of improving the adhesion between the modified PTFE particles and the carbon nanotubes, while the specific surface area of the PCTFE particles is preferably not smaller than the above-described lower limit from the standpoint of the ease of producing the composite resin material. Specifically, the specific surface area of the modified PTFE particles is measured by a BET method, which is a commonly-used specific surface area measurement method, using a specific surface area/pore distribution analyzer based on a constant-volume gas adsorption method.

The above descriptions regarding to the structure and the melting point of the modified PTFE in the composite resin material of the present invention also apply to the modified PTFE particles used in the production of the composite resin material of the present invention since these properties do not change before and after the composite formation.

A method of producing the modified PTFE particles that have an average particle diameter and a specific surface area in the above-described respective preferred ranges is not particularly restricted and, for example, a method of copolymerizing tetrafluoroethylene and perfluorovinyl ether may be employed. As a polymerization method, suspension polymerization is preferred. Examples of the method of producing the modified PTFE particles include: a method of spray-drying a dispersion containing a reactive polymer obtained by the above-described polymerization; a method of mechanically pulverizing the resulting modified PTFE polymer using a pulverizer, such as a hammer mill, a turbo mill, a cutting mill or a jet mill; and freeze-pulverization in which the resulting modified PTFE polymer is mechanically pulverized at a temperature of lower than room temperature. From the standpoint of the ease of obtaining modified PTFE particles having the desired average particle diameter and specific surface area, it is preferred to produce the modified PTFE particles using a pulverizer such as a jet mill.

The modified PTFE particles having an average particle diameter in the above-described preferable range may also be produced by adjusting the average particle diameter through a classification step using a sieve or an air flow.

Next, in a third step, the mixed slurry obtained in the second step is fed to a pressure-resistant vessel, and carbon dioxide is fed at a specific rate thereto while maintaining such temperature and pressure that bring carbon dioxide into a subcritical or supercritical state in the pressure-resistant vessel, whereby the pressure-resistant vessel is filled with carbon dioxide. As this carbon dioxide, any of liquid carbon dioxide, carbon dioxide in a gas-liquid mixed state and gaseous carbon dioxide may be used. The term "supercritical state" used herein for carbon dioxide refers to a state in which carbon dioxide has a temperature of not lower than the critical point and a pressure of not lower than the critical point, specifically a state in which carbon dioxide has a temperature of 31.1° C. or higher and a pressure of 72.8 atm or higher. Further, the term "subcritical state" used herein refers to a state in which carbon dioxide has a pressure of not lower than the critical point and a temperature of not higher than the critical point.

In the third step, the solvent and the dispersant that are contained in the mixed slurry dissolve into carbon dioxide, and the carbon nanotubes dispersed in the mixed slurry adhere to the modified PTFE particles.

From the standpoint of the ease of suppressing agglutination of the carbon nanotubes and allowing the carbon nanotubes to uniformly adhere to the surfaces of the modified PTFE particles, the feeding rate of carbon dioxide is, for example, preferably 0.25 g/min or lower, more preferably 0.07 g/min or lower, still more preferably 0.05 g/min or lower, with respect to 1 mg of the dispersant contained in the mixed slurry.

In the subsequent fourth step, while maintaining such temperature and pressure that bring carbon dioxide into a subcritical or supercritical state for a prescribed time, carbon dioxide is discharged from the pressure-resistant vessel along with the solvent and the dispersant that are dissolved in carbon dioxide.

Next, in a fifth step, an entrainer having a high affinity to the dispersant is added to the pressure-resistant vessel while maintaining the state of the fourth step. By this, the remaining dispersant can be efficiently removed. As the entrainer, for example, the solvent used in the first step for the preparation of the carbon nanotube dispersion may be used. Specifically, when an organic solvent is used in the first step, the same organic solvent may be used as the entrainer. When water is used as the solvent in the first step, it is preferred to use an alcohol-based solvent as the entrainer. It is noted here that the fifth step is an optional step for efficiently removing the dispersant and is not an indispensable step. The dispersant can also be removed by, for example, maintaining the fourth step without an addition of an entrainer.

Next, in a sixth step, carbon dioxide is removed from the pressure-resistant vessel by reducing the pressure in the pressure-resistant vessel, whereby the composite resin material of the present invention can be obtained. In this process, depending on the method of removing carbon dioxide, carbon dioxide and the solvent may remain in the resulting composite resin material. Accordingly, the remaining carbon dioxide and solvent can be efficiently removed by exposing the resulting composite resin material to vacuum or by heating the composite resin material.

The present invention also relates to a molded article produced using the composite resin material of the present invention. The molded article produced using the composite resin material of the present invention not only has excellent antistatic properties and/or electroconductivity but also maintains mechanical strength; therefore, it is suitable for various applications including electronics, electrical instruments, machines, and vehicles. The shape of the molded article is not particularly restricted, and the molded article may take any shape selected from the group consisting of, for example, a plate shape, a rod shape, a film shape, a sheet shape, an aggregate shape, and a tubular (cylindrical) shape. Each of the molded articles having such a shape is a molded article having an antistatic effect and/or electroconductivity, and the molded article may be a molded article to be used in the washing step performed in the semiconductor production for removal of contaminants, such as metal impurities and surface-adsorbing chemical substances, from a wafer and the like, a molded article to be pasted to the inner wall of a semiconductor production equipment, or a molded article to be pasted to the inner wall of a production equipment in which an organic solvent used in the semiconductor production is stored.

Examples of the molded article having a plate shape include those having a shape of a flat plate, a curved plate, a corrugated plate or the like. Examples of the molded articles having such a shape include materials for processing.

Examples of the molded article having a rod shape include those having a shape of a cylinder, a prism, a cone, a pyramid or the like. Examples of the molded articles having such a shape include materials for processing.

Examples of the molded article having a film shape or a sheet shape include lining sheets and antistatic sheets. Such a molded article may be a single-layer film or sheet of the molded article of the present invention, or a multi-layer film or sheet that includes, as at least one of its layers, the molded article of the present invention that has a film or sheet shape. The thickness of the molded article having a film or sheet shape is not particularly restricted, and it may be, for example about 0.05 to 100 mm. The molded article having such a shape is suitably used as a molded article to be used in a washing process in the semiconductor production, a molded article (lining sheet) to be pasted to the inner wall of a semiconductor production equipment, or a molded article (lining sheet) to be pasted to the inner wall of a production equipment in which an organic solvent used in the semiconductor production is stored.

Examples of the molded article having an aggregate shape include those having a shape of a sphere, a truncated cone, truncated pyramid, a bath, a block or the like. The molded articles having such a shape may be hollow molded articles, for example, hollow spherical molded articles.

Examples of the molded article having a tubular (cylindrical) shape include those having a hollow structure, such as a nozzle, a tube, a hose or a pipe. The molded article having a tubular shape may be a molded article having two openings as an outlet and an inlet, a molded article having a tube structure in which an opening is sealed, or a molded article having three or more openings. The molded article having a tubular (cylindrical) shape may also have a structure that is branched at least at one spot.

As a method of molding the molded article of the present invention, any method that is known and commonly used may be employed, and the method may be selected as appropriate in accordance with the intended use and the desired shape of the molded article. Examples of the method include molding methods, such as compression molding, hot-coining molding, isostatic molding, and ram extrusion molding. From the standpoints of mechanical properties, electrical properties and moldability, the molded article is preferably produced by compression molding or hot-coining molding. A molded article produced using the composite resin material of the present invention is, for example, a compression-molded article, a hot-coining molded article, an isostatic molded article, or a ram extrusion-molded article, of the composite resin material of the present invention.

As described above, the present invention also provides a molded article produced using the composite resin material of the present invention. It is noted here that, as apparent from the feature of having a specific average particle diameter, the composite resin material of the present invention is a particulate composite resin material. When the particulate composite resin material is molded by compression molding or the like, the particles of the modified polytetrafluoroethylene, at least the surface and/or the surface layer of which has carbon nanotubes existing thereon, are tightly adhered with each other in the form of aggregates in the resulting molded article. A molded article obtained using such a composite resin material, namely a molded article produced using the composite resin material of the present invention (e.g., a compression-molded article of the composite resin material of the present invention, or a hot-coining molded article of the composite resin material of the present invention) has a low volume resistivity as well as excellent weldability and cleanliness, and the volume resistivity tends to be hardly reduced by an SPM cleaning treatment or the like. Therefore, the molded article of the present invention is suitable for the use as, for example: a molded article to be used in the washing step performed in the semiconductor production for removal of contaminants, such as metal impurities and surface-adsorbing chemical substances, from a wafer and the like; a molded article to be pasted to the inner wall of a semiconductor production equipment; or a molded article to be pasted to the inner wall of a production equipment in which an organic solvent used in the semiconductor production is stored.

EXAMPLES

The present invention will now be described concretely by way of examples thereof; however, the below-described examples do not restrict the scope of the present invention.
[Measurement of Average Particle Diameter $D_{50}$]

The average particle diameter of the composite resin material of the present invention and that of the modified PTFE particles used in the production of the composite resin material of the present invention were each determined in terms of average particle diameter $D_{50}$ by measuring the particle size distribution using a laser diffraction-scattering particle size distribution analyzer ("MT3300II" manufactured by Nikkiso Co., Ltd.).
[Measurement of Specific Surface Area]

The specific surface area of the composite resin material of the present invention and that of the modified PTFE particles used in the production of the composite resin material of the present invention were measured in accordance with JIS Z8830 using a specific surface area/pore distribution analyzer (BELSORP-mini II manufactured by Bel Japan Corp.).
(Crystallization Heat)

The crystallization heat of a fluorine resin contained in the composite resin material of the present invention was determined using a differential scanning calorimeter ("DSC-50" manufactured by Shimadzu Corporation). A measurement sample in an amount of 3 mg was heated to 250° C. at a rate of 50° C./min, maintained at this temperature once, and further heated to 380° C. at a rate of 10° C./min so as to melt crystals, after which the measurement sample was cooled at a rate of 10° C./min. A peak crystallization temperature measured in this process was converted into the amount of heat to determine the crystallization heat.
[Production of Molded Articles]

Each composite resin material obtained in the below-described Examples and Comparative Examples was subjected to a pretreatment (e.g., pre-drying and/or granulation) as required, and then uniformly filled into a mold for molding in a certain amount. This composite resin material was subsequently maintained under a pressure of 15 MP for a certain period and thereby compressed to obtain an unfired compression-molded article. The thus obtained unfired compression-molded article was taken out of the mold and fired for at least 2 hours in a hot-air circulation-type electric furnace set at 350° C. or higher, after which the resultant was slowly cooled and then taken out of the electric furnace, whereby a fired compression-molded article of the composite resin material was obtained.
[Measurement of Volume Resistivity]

A test piece of φ110×10 mm, which was prepared by cutting each molded article obtained in accordance with the above-described molded article production method, was used as a measurement sample.

The volume resistivity was measured in accordance with JIS K6911 using a resistivity meter ("LORESTA" or "HIRESTA" manufactured by Mitsubishi Chemical Analytech Co., Ltd.).
[Measurement of Mechanical Strength]
(Tensile Elastic Modulus, Tensile Strength, and Tensile Elongation (Breaking Point))

A dumbbell test piece according to JIS K7137-2-A, which was prepared by cutting each molded article obtained in accordance with the above-described molded article production method, was used as a measurement sample.

The tensile elastic modulus, the tensile strength and the tensile elongation (breaking point) of the measurement sample were measured in accordance with JIS K7137-2-A at a load of 5 kN and a rate of 1 mm/min using a tensile tester ("TENSILON Universal Material Testing Instrument" manufactured by A&D Co., Ltd.).

(Compressive Elastic Modulus and Compressive Strength (25% Deformation))

A test piece of φ8×20 mm, which was prepared by cutting each molded article obtained in accordance with the above-described molded article production method, was used as a measurement sample.

The compressive elastic modulus and the compressive strength (25% deformation) of the measurement sample were measured in accordance with JIS K7181 at a load of 5 kN and a rate of 1 mm/min using a compression tester ("TENSILON Universal Material Testing Instrument" manufactured by A&D Co., Ltd.).

(Bending Elastic Modulus and Bending Strength)

A test piece of 4 mm in thickness, 10 mm in width and 80 mm in length, which was prepared by cutting each molded article obtained in accordance with the above-described molded article production method, was used as a measurement sample.

The bending elastic modulus and the bending strength of the measurement sample were measured in accordance with JIS K7171 at a load of 5 kN and a rate of 10 mm/min using a bending tester ("TENSILON Universal Material Testing Instrument" manufactured by A&D Co., Ltd.).

[Weld Strength]

Figure 2:
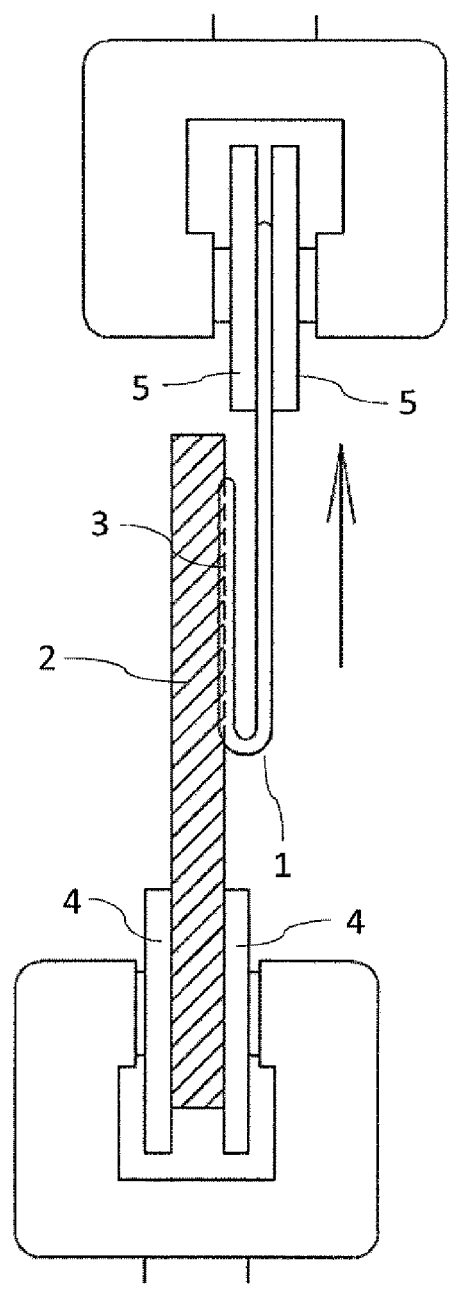
FIG. 2 is a drawing for describing a method of measuring the weld strength of the composite resin material of the present invention.

A method of measuring the weld strength will now be described referring to FIGS. 1 and 2. First, a test piece of 10 mm in thickness, 30 mm in width and 100 mm in length ("2" in FIG. 1) was prepared by cutting each molded article obtained in accordance with the above-described molded article production method, and a V-shaped groove of 50 mm in length and about 1 mm in depth ("3" in FIG. 1) was cut on this test piece. Then, using a hot-air welding machine, a PFA welding rod of 3 mm in diameter ("1" in FIG. 1) was welded to the groove part such that the resulting fused portion had a length of 50 mm, whereby such a test piece for weld strength measurement as illustrated in FIG. 1 was prepared. Thereafter, this test piece for weld strength measurement was set in a tensile tester such that the folded part of the fused PFA welding rod 1 was on the lower side as illustrated in FIG. 2, and one end of the test piece was sandwiched and immobilized with lower chucks, while a portion of the welding rod that was left unfused was sandwiched and immobilized with upper chucks. The test piece was pulled in the direction of the arrow illustrated in FIG. 2 at a rate of 10 mm/min, and the maximum stress was measured and defined as the weld strength.

[Evaluation of Molded Articles]

[Amount of Eluted Metals]

The degree of metal contamination in each molded article due to an addition of carbon nanotubes was evaluated by measuring the amount of eluted metal for 17 metallic elements using an ICP mass spectrometer ("ELAN DRC II" manufactured by PerkinElmer Co., Ltd.). Specifically, a 10 mm×20 mm×50 mm test piece, which was prepared by cutting each molded article obtained in accordance with the above-described molded article production method, was immersed in 0.5 L of 3.6% hydrochloric acid (EL-UM Grade, manufactured by Kanto Chemical Co., Inc.) for about one hour. After the one-hour immersion, the test piece was taken out, washed with running ultrapure water (specific resistance: ≥18.0 MΩ·cm), and then stored in a room-temperature environment for 24 hours and 168 hours in a state of being entirely immersed in 0.1 L of 3.6 hydrochloric acid. The whole amount of the resulting immersion liquid was recovered after each of the prescribed periods, and the metal impurity concentration of the immersion liquid was analyzed.

[Carbon Detachment]

The degree of detachment of carbon nanotubes from each molded article was evaluated by measuring the TOC using a total organic carbon analyzer ("TOCvwp" manufactured by Shimadzu Corporation). Specifically, a 10 mm×20 mm×50 mm test piece, which was prepared by cutting each molded article obtained in accordance with the above-described molded article production method, was immersed in 0.5 L of 3.6% hydrochloric acid (EL-UM Grade, manufactured by Kanto Chemical Co., Inc.) for about one hour. After the one-hour immersion, the test piece was taken out, washed with running ultrapure water (specific resistance: ≥18.0 MΩ·cm), and then stored in a room-temperature environment for 24 hours and 168 hours in a state of being entirely immersed in ultrapure water. The whole amount of the resulting immersion liquid was recovered after each of the prescribed periods, and a total organic carbon analysis was performed on the thus recovered immersion liquid.

[Sulfuric Acid-Hydrogen Peroxide Mixture Immersion Treatment (SPM Treatment)]

In a glass beaker, 98% sulfuric acid and 30% hydrogen peroxide were mixed at a weight ratio of 2:1 to prepare a sulfuric acid-hydrogen peroxide mixture. When the temperature of the thus prepared sulfuric acid-hydrogen peroxide mixture reached a highest point due to the reaction heat, dumbbell test pieces according to JIS K7137-2-A, which were prepared by cutting molded articles obtained from the respective composite resin materials of the below-described Examples and Comparative Examples in accordance with the above-described molded article production method, were each added to the mixture and immersed for 24 hours. After the 24-hour immersion, the preparation of sulfuric acid-hydrogen peroxide mixture and the 24-hour immersion were repeated, and the volume resistivity was determined in the same manner as described above for each of the test pieces immersed for a total of 30 days.

[Resin Particles]

In the following Examples and Comparative Examples, the modified PTFE particles, polytetrafluoroethylene (PTFE) particles or PCTFE particles shown in Table 1 below were used. It was confirmed that the modified PTFE particles 1 and 2 shown in Table 1 had a tetrafluoroethylene unit represented by the above-described Formula (I) and a perfluorovinyl ether unit represented by the above-described Formula (II) (wherein, X is a perfluoropropyl group), and that the amount of the perfluorovinyl ether unit was 0.01 to 1% by mass based on a total mass of the modified polytetrafluoroethylene.

TABLE 1

|  | Average particle diameter $D_{50}$ [μm] | Specific surface area [m$^2$/g] | Crystallization heat [J/g] | Melting point [° C.] |
|---|---|---|---|---|
| Modified PTFE particles 1 | 19.6 | 1.3 | 19.0 | 325 |
| Modified PTFE particles 2 | 392.5 | 2.4 | 19.7 | 324 |

TABLE 1-continued

| | Average particle diameter $D_{50}$ [μm] | Specific surface area [m²/g] | Crystallization heat [J/g] | Melting point [° C.] |
|---|---|---|---|---|
| PTFE particles | 50.4 | 2.0 | 13.2 | 329 |
| PCTFE particles | 10.3 | 2.9 | 10.0 | 213 |

Example 1

First, 500 g of a carbon nanotube dispersion using water as a solvent (dispersant=0.15% by mass, carbon nanotubes=0.025% by mass) was diluted by adding thereto 3,500 g of ethanol. Then, 1,000 g of the modified PTFE particles 1 was added to the resultant to prepare a mixed slurry.

Next, the thus prepared mixed slurry was fed to a pressure-resistant vessel, and liquid carbon dioxide was fed thereto at a rate of 0.03 g/min with respect to 1 mg of the dispersant contained in the mixed slurry in the pressure-resistant vessel, after which the pressure and the temperature inside the pressure-resistant vessel were raised to 20 MPa and 50° C., respectively. While maintaining the pressure and the temperature for 3 hours, carbon dioxide was discharged from the pressure-resistant vessel along with the solvents (water and ethanol) and the dispersant that were dissolved in carbon dioxide.

Thereafter, the pressure and the temperature inside the pressure-resistant vessel were reduced to atmospheric pressure and normal temperature so as to remove carbon dioxide from the pressure-resistant vessel, whereby a CNT composite resin material was obtained.

Example 2

A composite resin material of Example 2 was obtained in the same manner as in Example 1, except that the amount of the CNTs was changed to 0.05% by mass based on the composite resin material to be obtained.

Example 3

A composite resin material of Example 3 was obtained in the same manner as in Example 1, except that the amount of the CNTs was changed to 0.1% by mass based on the composite resin material to be obtained.

Example 4

A composite resin material of Example 4 was obtained in the same manner as in Example 1, except that the modified PTFE 2 was used in place of the modified PTFE 1.

Example 5

A composite resin material of Example 5 was obtained in the same manner as in Example 2, except that the modified PTFE 2 was used in place of the modified PTFE 1.

Comparative Example 1

The modified PTFE 1 that was not made into a composite with CNTs was used as Comparative Example 1.

Comparative Example 2

The modified PTFE 2 that was not made into a composite with CNTs was used as Comparative Example 2.

Comparative Example 3

The PTFE particles not made into a composite with CNTs was used as Comparative Example 3.

Comparative Example 4

A commercially available molded article (material) in which 15% by weight of graphite was added to PTFE was used as Comparative Example 4.

Comparative Example 5

A commercially available molded article (material) in which 15% by weight of carbon fibers was added to PTFE was used as Comparative Example 5.

Comparative Example 6

A resin material of Comparative Example 6 was obtained in the same manner as in Example 1, except that PCTFE particles were used in place of the modified PTFE 1.

Comparative Example 7

A resin material of Comparative Example 7 was obtained in the same manner as in Example 2, except that PCTFE particles were used in place of the modified PTFE 1.

For the resin materials obtained in the above-described Examples and Comparative Examples, the average particle diameter and the specific surface area were measured in accordance with the above-described respective measurement methods. The results thereof are shown in Table 2. Further, the results of measuring the volume resistivity for the molded articles produced in accordance with the above-described method using the respective resin materials obtained in Examples and Comparative Examples are also shown in Table 2.

TABLE 2

| | | Resin | Amount of CNT [% by mass] | Average particle diameter $D_{50}$ [μm] | Specific surface area [m²/g] | Volume resistivity [Ω·cm] |
|---|---|---|---|---|---|---|
| Example | 1 | Modified PTFE 1 | 0.025 | 30.0 | 1.0 | $10^7$ |
| | 2 | Modified PTFE 1 | 0.05 | 30.4 | 1.8 | $10^2$ |
| | 3 | Modified PTFE 1 | 0.1 | 19.8 | 1.7 | $10^1$ |
| | 4 | Modified PTFE 2 | 0.025 | 450.2 | 3.2 | $10^{11}$ |
| | 5 | Modified PTFE 2 | 0.05 | 436.9 | 3.4 | $10^7$ |
| Comparative Example | 1 | Modified PTFE 1 | 0 | 19.6 | 1.3 | $>10^{14}$ |
| | 2 | Modified PTFE 2 | 0 | 392.5 | 2.4 | $>10^{14}$ |
| | 3 | PTFE | 0 | 50.4 | 2.0 | $>10^{14}$ |
| | 4 | PTFE | *[1]GF15 | — | — | $>10^{14}$ |
| | 5 | PTFE | *[2]CF15 | — | — | $10^1$ |

TABLE 2-continued

|   | Resin | Amount of CNT [% by mass] | Average particle diameter $D_{50}$ [μm] | Specific surface area [m²/g] | Volume resistivity [Ω·cm] |
|---|---|---|---|---|---|
| 6 | PCTFE | 0.025 | 10.0 | 2.8 | $10^8$ |
| 7 | PCTFE | 0.05 | 10.2 | 2.1 | $10^4$ |

*[1]GF: graphite
*[2]CF: carbon fiber

With regard to the molded articles produced in accordance with the above-described method using the respective resin materials obtained in Examples and Comparative Examples, the results of measuring the tensile elastic modulus, the tensile strength and the tensile elongation (breaking point) are shown in Table 3. The results of measuring the weld strength in accordance with above-described method are also shown in Table 3.

TABLE 3

|   |   | Tensile elastic modulus [MPa] | Tensile strength [MPa] | Tensile elongation [%] | Weld strength [MPa] |
|---|---|---|---|---|---|
| Example | 1 | 526 | 31 | 353 | 10 |
|  | 2 | 443 | 31 | 367 | 11 |
|  | 3 | 505 | 33 | 441 | — |
|  | 4 | 379 | 22 | 356 | — |
|  | 5 | 287 | 21 | 378 | — |
| Comparative Example | 1 | 403 | 32 | 380 | 13 |
|  | 2 | 340 | 20 | 421 | — |
|  | 3 | 400 | 22 | 367 | — |
|  | 4 | 520 | 20 | 307 | 1 |
|  | 5 | 442 | 21 | 242 | 2 |
|  | 6 | 1,410 | 39 | 49 | not weldable |
|  | 7 | 1,244 | 39 | 45 | not weldable |

With regard to the molded articles produced in accordance with the above-described method using the respective resin materials obtained in Examples and Comparative Examples, the results of measuring the compressive elastic modulus, the compressive strength (25% deformation), the bending elastic modulus and the bending strength are shown in Table 4.

TABLE 4

|   |   | Compressive elastic modulus [MPa] | Compressive strength [%] | Bending elastic modulus [MPa] | Bending strength [MPa] |
|---|---|---|---|---|---|
| Example | 1 | 510 | 27 | 428 | 15 |
|  | 2 | 498 | 28 | 456 | 16 |
|  | 3 | 451 | 27 | 614 | 20 |
|  | 4 | 551 | 28 | 705 | 22 |
|  | 5 | 573 | 28 | 623 | 20 |
| Comparative Example | 1 | 502 | 27 | 435 | 16 |
|  | 3 | 529 | 27 | 666 | 20 |
|  | 6 | 1,159 | 64 | 1,641 | 67 |
|  | 7 | 1,204 | 67 | 1,639 | 67 |

The amount of eluted metals and the carbon detachment were evaluated for the molded articles produced in accordance with the above-described method using the respective resin materials obtained in Examples and Comparative Examples. The results thereof are shown in Table 5. As for those elements other than the ones listed under "Amount of eluted metals" in Table 5 (Ag, Cd, Co, Cr, K, Li, Mn, Na, Ni, Pb, Ti, and Zn), the amount of eluted metals was measured to be below the detection limit (ND) of the spectrometer; therefore, the results thereof are not shown in Table 5. It is noted here that the results shown in Table 5 were all obtained after the 24-hour immersion.

TABLE 5

|   |   | TOC [ppb] | Amount of eluted metals [ppb] (3.6% hydrochloric acid/after 24-hour immersion) | | | | |
|---|---|---|---|---|---|---|---|
|   |   |   | Al | Ca | Cu | Fe | Mg |
| D.L. |   | 50 | 0.001 | 0.001 | 0.003 | 0.005 | 0.0005 |
| Example | 1 | <50 | 0.008 | 0.06 | 0.007 | 0.05 | 0.006 |
|  | 2 | <50 | 0.006 | 0.07 | 0.008 | 0.05 | 0.006 |
| Comparative Example | 1 | <50 | 0.008 | 0.05 | 0.010 | 0.05 | 0.01 |
|  | 7 | <50 | 0.003 | 0.02 | ND | 0.01 | 0.002 |

For the molded article produced in accordance with the above-described method using the resin material obtained in Example 2, a sulfuric acid-hydrogen peroxide immersion treatment (SPM treatment) was performed under the above-described conditions, and the volume resistivity was measured after the treatment. As a result, the volume resistivity before the SPM treatment and the volume resistivity after the treatment were both found to be $10^2$ Ω·cm; therefore, it was confirmed that the resin material of the present invention shows no increase in the volume resistivity even when subjected to an SPM treatment.

From the results shown in Table 2, it is seen that the molded articles, which were obtained from the composite resin materials containing modified PTFE and CNTs and having an average particle diameter of 500 μm or smaller, had a low volume resistivity. Particularly, from a comparison with Comparative Examples 4 and 5 where 15% by mass of graphite or 15% by mass of carbon fibers was incorporated, it was confirmed that an efficient volume resistivity-reducing effect is attained with a small amount of CNTs.

From the results shown in Tables 3 and 4, it is seen that the molded articles, which were obtained from the composite resin materials containing modified PTFE and CNTs and having an average particle diameter of 500 μm or smaller, had substantially the same mechanical strength and weld strength as the molded articles of Comparative Examples 1 and 2 that contained no CNT. Therefore, it was confirmed that, according to the composite resin material of the present invention, a low volume resistivity can be achieved without markedly reducing the mechanical strength and the weld strength. On the other hand, it was confirmed that, in the molded articles obtained from such electroconductive materials containing a conventionally-used PTFE and graphite as shown in Comparative Examples 4 and 5, the weld strength was markedly reduced as compared to the molded articles obtained from the composite resin materials of the present invention that had an equivalent or higher antistatic effect or electroconductivity.

From the results shown in Table 5, it was confirmed that the molded articles obtained from the composite resin materials of the present invention exhibited substantially the same amounts of eluted metals and carbon detachment and had superior cleanliness as compared to the molded articles of Comparative Example 1 in which the resin particles were not made into a composite with CNTs. Further, it was also confirmed that the composite resin materials of the present invention not only showed no reduction in the volume resistivity in comparison before and after the SPM treatment but also had a high chemical resistance.

In accordance with the above-described molded article production method, test pieces having a size of 10 mm×10 mm×2 mm (thickness) were prepared using each of the composite resin materials obtained in Example 2 and Comparative Examples 4 and 5. These test pieces were each immersed in the various chemical liquids shown in Table 6, and the changes in weight before and after one-week (1W) or about-one-month (1M) immersion were determined. In addition, as Comparative Example 8, a test piece of a commercially available composite material (composite material of a PFA resin and carbon fibers) having the above-described size was also subjected to the same immersion tests. It is noted here that, in Table 6, the immersion tests in APM were conducted at a temperature of 80° C., while the immersion tests in other chemical liquids were conducted at room temperature. The results thereof are shown in Table 6. The details of the chemical liquids in Table 6 are as shown in Table 7.

TABLE 6

| | | Example 2 | | Comparative Example 4 | | Comparative Example 5 | | Comparative Example 8 | |
|---|---|---|---|---|---|---|---|---|---|
| | Chemical liquid | 1 W | 1 M | 1 W | 1 M | 1 W | 1 M | 1 W | 1 M |
| Organic liquid | IPA | 0.00 | −0.08 | 0.00 | −0.09 | 0.08 | 0.00 | 0.08 | 0.08 |
| | Thinner | 0.08 | 0.00 | 0.00 | 0.00 | 0.40 | 0.32 | 0.34 | 0.42 |
| Acidic liquid | Hydrogen peroxide | 0.08 | 0.00 | 0.00 | −0.09 | −0.09 | −0.09 | 0.00 | −0.18 |
| | Hydrochloric acid | 0.00 | 0.00 | 0.09 | 0.00 | 0.00 | 0.00 | 0.17 | 0.08 |
| | SC-2 | 0.08 | 0.00 | 0.00 | −0.08 | 0.00 | −0.08 | 0.00 | −0.08 |
| | SPM | 0.00 | — | 0.00 | — | 0.09 | — | 2.21 | — |
| Basic liquid | APM (SC-1) | 0.00 | — | 0.08 | — | 0.00 | — | 0.00 | — |
| | Aqueous ammonia | 0.00 | −0.08 | 0.00 | −0.09 | 0.00 | −0.09 | 0.00 | −0.08 |

TABLE 7

| Description in Table 6 | Component |
|---|---|
| IPA | Isopropyl alcohol |
| Thinner | NTX Eco Thinner manufactured by Sankyo Chemical Co., Ltd. |
| Hydrogen peroxide | Hydrogen peroxide (30%) |
| Hydrochloric acid | Hydrochloric acid (37%) |
| SC-2 | Mixture of 37% hydrochloric acid, 30% hydrogen peroxide, and deionized water (hydrochloric acid:hydrogen peroxide:deionized water = 1:1:5 (mass ratio)) |
| SPM | Mixture of 98% sulfuric acid and 30% hydrogen peroxide (sulfuric acid:hydrogen peroxide = 2:1 (mass ratio)) |
| APM (SC-1) | Mixture of 28% aqueous ammonia, 30% hydrogen peroxide, and deionized water (aqueous ammonia:hydrogen peroxide:deionized water = 1:1:5 (mass ratio)) |
| Aqueous ammonia | Aqueous ammonia(28%) |

DESCRIPTION OF SYMBOLS

1: PFA welding rod
2: test piece
3: groove
4: lower chuck
5: upper chuck

The invention claimed is:

1. A composite resin material, comprising
a modified polytetrafluoroethylene and carbon nanotubes,
wherein the composite resin material has an average particle diameter of 500 μm or smaller, and
wherein the composite resin material comprises the carbon nanotubes in an amount of 0.01 to 2.0% by mass based on a total amount of the composite resin material, and
wherein the modified polytetrafluoroethylene is a compound comprising:
a tetrafluoroethylene unit represented by the following Formula (I):

a perfluorovinyl ether unit represented by the following Formula (II):

wherein X represents a perfluoroalkyl group having 1 to 6 carbon atoms, or a perfluoroalkoxyalkyl group having 4 to 9 carbon atoms, and
the perfluorovinyl ether unit represented by Formula (II) is contained in the modified polytetrafluoroethylene in an amount of 0.01 to 1% by mass based on a total mass of the modified polytetrafluoroethylene,
wherein the modified polytetrafluoroethylene has a crystallization heat of from 16 J/g to 25 J/g, and
wherein the modified polytetrafluoroethylene has a melting point of from 300 to 380° C.

2. The composite resin material according to claim 1, having a specific surface area of 0.5 to 9.0 m²/g as measured by a BET method.

3. The composite resin material according to claim 1, having a volume resistivity of $10^{11}$ Ω·cm or lower as measured in accordance with JIS K6911.

4. A molded article produced using the composite resin material according to claim 1.

5. A molded article, which is a compression-molded product of the composite resin material according to claim 1.

6. The molded article according to claim 4, having a shape selected from the group consisting of a plate shape, a rod shape, a film shape, a sheet shape, an aggregate shape, and a tubular shape.

7. The molded article according to claim 5, having a shape selected from the group consisting of a plate shape, a rod shape, a film shape, a sheet shape, an aggregate shape, and a tubular shape.

* * * * *